United States Patent Office 2,803,621
Patented Aug. 20, 1957

2,803,621

THERMOPLASTIC FUSION BLEND OF EMULSION-PREPARED POLYVINYL CHLORIDE RESIN AND A SMALL AMOUNT OF BUTADIENE:ACRYLONITRILE COPOLYMER RUBBER

Eli Schwartz, New Haven, and Martin J. Kleinfeld, Naugatuck, Conn., assignors to United States Rubber Company, New York, N. Y., a corporation of New Jersey No Drawing. Application May 28, 1954,
Serial No. 433,272

1 Claim. (Cl. 260—45.5)

This invention relates to a thermoplastic composition having an unusual community of desirable physical properties and more particularly it relates to an intimate blend of polyvinyl chloride resin and butadiene:acrylonitrile rubbery copolymer in certain critical proportions.

Although polyvinyl chloride resin has a number of desirable physical properties, it nevertheless has certain definite limitations which have, up to the present time, precluded its more widespread use for certain purposes. Thus, although the hardness, rigidity and chemical resistance of polyvinyl chloride suggest this material as suitable for the manufacture of pipes and fittings, such as are used particularly in oil fields primarily for the purpose of carrying brine, attempts to so use polyvinyl chloride resin up until now have not met with notable success, because the material is deficient in impact strength. While there are various compounding practices capable of effecting a nominal increase in the impact strength of polyvinyl chloride, such expedients are inevitably accompanied by a concomitant decrease in flexural strength, tensile strength, and other properties. Thus, if it is attempted to improve the impact strength of polyvinyl chloride by adding a typical solvent plasticizer thereto in significant amount, the resulting composition no longer has high flexural strength, and is totally unsuitable for such purposes as making rigid pipe of the kind referred to. Accordingly, the principal object of the present invention is to provide a truly rigid polyvinyl chloride resin composition of high impact strength, that simultaneously has high flexural strength and good tensile strength, coupled with excellent resistance to such deteriorating chemicals as brine, oils, acids, alkalies, and aliphatic solvents.

The present invention is based on the unexpected discovery that if a critical, small amount of a butadiene:acrylonitrile copolymer rubber, within the range of from 2 to 5 parts by weight, is milled into 100 parts of polyvinyl chloride resin of the kind obtained by emulsion polymerization, the impact strength of the resin is increased many times over, while the flexural strength, tensile strength, and other desirable properties, remain substantially unimpaired. The unique effect of such critical, small amounts of butadiene:acrylonitrile copolymer rubber is particularly unexpected in view of the fact that significantly larger amounts of such copolymer rubber result in mixtures having not only unsatisfactory impact strength, but drastically reduced flexural strength and tensile strength as well.

The butadiene:acrylonitrile copolymer rubber employed in the invention is a commercially available synthetic rubber, variously known as Paracril, Buna-N, or Perbunan, and for purposes of the invention should contain from 18% to 22% of combined acrylonitrile.

The polyvinyl chloride resin employed may be any commercially available high molecular weight gamma polyvinyl chloride resin of the type made by emulsion polymerization, as distinguished from the resin made by suspension polymerization. As is understood by those skilled in this art, the emulsion process of polymerizing vinyl chloride utilizes an emulsifying agent, along with the polymerization catalyst and other polymerization recipe ingredients, and the solid polymer formed in the aqueous polymerization medium remains in true emulsion and does not settle out. The preparation of polyvinyl chloride in aqueous emulsion is illustrated in detail in the Mark Patent 2,068,424. The solid polymer is recovered from the resulting "latex" by any method, such as coagulation or spray drying, for use in the present invention. In contrast to this the suspension type of polymer is made with the aid of a suspension agent, rather than a true emulsifying agent, and the polymer settles out of itself when agitation of the polymerization mixture is discontinued. The preparation of polyvinyl chloride by the suspension method is illustrated in the Crum Crawford Patent 2,194,354. The latter type of resin does not provide the surprising increase in impact strength obtainable by using the emulsion-prepared polymer in accordance with the invention.

In carrying out the invention the solid, aqueous emulsion prepared polyvinyl chloride resin is admixed with the butadiene:acrylonitrile resin with the aid of a roll mill or equivalent device on which the mixture is intimately fusion blended, the mill being heated to a temperature in excess of the softening temperature of the resin. While the mixture of the invention consists essentially of the polyvinyl chloride resin and the butadiene:acrylonitrile copolymer rubber in the critical proportions previously set forth, there may also be included in the mixture small amounts of secondary ingredients, such as heat stabilizers and/or antioxidants to prevent deterioration of the polyvinyl chloride, and non-solvent lubricants to aid in milling and processing. Such secondary ingredients will ordinarily not amount to more than some 6 to 10 parts in 100 parts of the resin. In any event, the mixture will be devoid of true solvent plasticizers, which would destroy the rigid nature of the material.

In general, the compositions of the invention are truly rigid, strong materials, having a flexural strength of at least 8000 p. s. i., a flexural modulus of at least 2.5×10$^5$ p. s. i., and a tensile strength of at least 4800 p. s. i.

The following examples in which all parts are expressed by weight will illustrate the practice of the invention in more detail.

*Example I*

A series of formulations of the following composition were fusion blended on a hot mill at a temperature of about 320–330° F.:

Polyvinyl chloride solid resin made by emulsion polymerization (Marvinol) _____ 100.
Butadiene-acrylonitrile copolymer rubber (Paracril AJ, containing 18–22% acrylonitrile) __ Variable.
Cadmium stabilizer _____ 3.
Organo tin stabilizer _____ 2.
Lubricant _____ 2.
Antioxidant _____ 2.

The amount of the butadiene:acrylonitrile rubber in the foregoing composition was varied from 0 part to 20 parts in increments, and the compositions were molded into test samples for determination of physical properties, including the Izod notched impact strength, the flexural strength, flexural modulus, tensile strength, and Rockwell hardness on the R scale. The sample containing no butadiene:acrylonitrile rubber had an impact strength of 3.1 foot-pounds per inch of notch, while a sample containing 2 parts of this rubber had an impact strength of 13.8 foot-pounds. Increasing the butadiene:acrylonitrile content to 3, 4 and 5 parts yielded impact strength of 14.8, 15.8 and 17.9 foot-pounds, respectively. However when the copolymer rubber content was increased to 10, 15 and 20 parts, markedly reduced impact strength values of 8.0, 9.5 and 8.0 foot-pounds, respectively were obtained.

Even more striking was the falling off in flexural strength at copolymer rubber contents in excess of 5 parts. Thus, the initial flexural strength of the material containing no rubber was 11,000 p. s. i. Increasing the butadiene:acrylonitrile rubber content to 2, 3, 4 and 5 parts gave flexural strength values of 10,000, 9550, 9750 and 8100 p. s. i., respectively, all of which are on an acceptable level. However, increasing the copolymer rubber content to 7, 10, 15 and 20 parts quickly reduced the flexural strength to unacceptable levels of 7090, 5790, 4700 and 3720 p. s. i. respectively.

A similar effect was noted in the case of the flexural modulus, which was $3.3 \times 10^5$ p. s. i. at zero copolymer rubber content, and 3.5, 3.5, 3.5 and $3.0 \times 10^5$ p. s. i. at 2, 3, 4, and 5 parts, respectively, of rubber, but dropped off sharply to 2.4, 2.1, 1.8 and $1.4 \times 10^5$ p. s. i. when the butadiene:acrylonitrile copolymer content was increased to 7, 10, 15 and 20 parts, respectively.

The tensile strength of the composition containing no copolymer rubber was 6530 p. s. i., and acceptably high levels of 5720, 5410, 5590 and 5045 p. s. i. were maintained as the rubber content was increased to 2, 3, 4 and 5 parts, respectively. Rapid falling off of the tensile strength to unacceptable levels of 4665, 3705 and 2230 p. s. i. took place with subsequent increases in the rubber content to 7, 10 and 20 parts respectively.

An initial Rockwell hardness value of 109 on the R scale remained at levels of 110, 111, 109 and 104 when the rubber was increased to 2, 3, 4 and 5 parts, respectively, while further increases in rubber content to 7, 10, 15 and 20 parts quickly reduced the hardness to 101, 95, 83 and 65, respectively.

*Example II*

Example I is repeated, except that polyvinyl chloride resin solids obtained from a suspension polymerization is substituted for that obtained from an emulsion polymerization. The impact strengths of molded samples were as follows:

| Parts of Butadiene: Acrylonitrile Resin | 0 | 2 | 3 | 5 | 7 | 10 | 15 | 20 |
|---|---|---|---|---|---|---|---|---|
| Impact Strength, Izod, ft. lbs./in. notch | 1.1 | 1.1 | 1.2 | 1.3 | 1.1 | 1.0 | 1.3 | 1.2 |

It will be apparent that no significant increase in impact strength is obtainable, even within the critical range employed in the invention, and therefore the invention requires the critical selection of polyvinyl chloride resin solids derived from an emulsion polymerizate.

*Example III*

Compositions containing 3 parts of butadiene:acrylonitrile copolymer rubber in 100 parts of emulsion derived polyvinyl chloride resin were prepared as in Example I, using butadiene:acrylonitrile rubbers of varying acrylonitrile content, and the impact strength of the resulting mixes was determined, with the following results:

| Percent Acrylonitrile in Butadiene: Acrylonitrile Copolymer | Impact Strength (ft.-lbs./inch notch) |
|---|---|
| 36 | 2.0 |
| 27 | 2.9 |
| 20.5 | 17.4 |
| 10 | 3.4 |
| 5 | 2.0 |

This illustrates the failure of butadiene:acrylonitrile rubbers, containing combined acrylonitrile in an amount outside the range specified, to produce the desired increase in impact strength.

Having thus described our invention, what we claim and desire to protect by Letters Patent is:

A thermoplastic fusion blend consisting essentially of 100 parts of solid emulsion-prepared polyvinyl chloride resin and from 2 to 5 parts of butadiene:acrylonitrile copolymer rubber containing from 18 to 22% of combined acrylontrile, the said blend being characterized by an impact strength at least several times greater than the impact strength of the polyvinyl chloride resin alone, a flexural strength of at least 8000 pounds per square inch, a flexural modulus of at least $2.5 \times 10^5$ pounds per square inch, and a tensile strength of at least 4800 pounds per square inch.

References Cited in the file of this patent

UNITED STATES PATENTS

| | | |
|---|---|---|
| 2,580,460 | Patton et al. | Jan. 1, 1952 |
| 2,582,740 | Ayers | Jan. 15, 1952 |
| 2,614,094 | Wheelock | Oct. 14, 1952 |

OTHER REFERENCES

Young et al.: Ind. Eng. Chem. 41, 401–408, February 1949.